2,964,466

PROCESS OF CLARIFYING TURBID WATER USING COTTRELL FLOUR AND ACIDIFYING COAGULANT

Willard Farnham, 5741 NE. Glisan St., Portland 13, Oreg.

No Drawing. Filed Mar. 6, 1956, Ser. No. 569,676

7 Claims. (Cl. 210—52)

The present invention relates to the treatment of water and more particularly to a new and improved process for clarifying turbid water.

To remove suspended or colloidal particles from water to clarify the same, it is the practice to add to the water a coagulant such as alum which forms a floc that will settle out of the water, carrying with it the turbidity producing materials.

It is a principal object of the present invention to provide a new and improved process for assuring the formation of an efficient turbidity removing floc in such a water purification process.

Another object is to provide a process for clarifying water that is economical from the standpoint of time and materials used.

An additional object of the invention is to provide a coagulation process which is operative to clarify water over a wide range of conditions.

These and other objects and advantages are accomplished in accordance with the present invention by treating water to be clarified with a fluocculant or coagulant in the presence of the finely divided waste effluent recovered from Cottrell precipitators in the waste stacks of a Portland cement plant and more commonly denoted as "Cottrell flour." The Cottrell flour acts as a coagulant aid in that its addition to the water along with the coagulant assists in the formation of a rapidly settling floc of large particle size capable of efficiently removing turbidity producing materials from water.

As used herein "Cottrell flour" refers to the effluent recovered in Cottrell precipitators of a Portland cement plant.

The composition of typical Cottrell flour is set forth in Table I below. The table indicates the high and low limits of the components of Cottrell flour recovered from the stacks of the Oregon Portland Cement Co., Oswego, Oregon.

TABLE I
*Composition of Cottrell flour*

|  | Low | High |
|---|---|---|
| $SiO_2$ | 14 | 16%. |
| $Fe_2O_3$ | 2.8 | 3.8%. |
| $Al_2O_3$ | 3.2 | 3.6. |
| $CaO$ | 47.6 | 54.3. |
| $MgO$ | 1.84 | 1.99. |
| $S$ | 1.32 | 2.5. |
| $SO_3$ | 2.41 |  |
| $K_2O$ | 1.44 | 2.04. |
| $Na_2O$ | 1.23 | 1.44. |
| Loss on Ignition | 24.20 | 11.25. |

Suitable flocculants or coagulants for the purposes of the present invention include the alums such as aluminum sulfate, aluminum ammonium sulfate, aluminum potassium sulfate, and like aluminum salts capable of forming voluminous flocs, and the conventional iron compounds. Aluminum sulfate is preferred because of its lower cost, ease of handling, and its ability to form a suitable floc under a wide range of conditions.

The water clarification process of the invention may be carried out either as a batch process or as a continuous process. In a batch process the turbid water is added to a mixing basin and the coagulant and Cottrell flour added to the water in quantities which are dependent upon the properties of the water to be treated. After a suitable period of agitation, the water is passed to a settling basin and the water allowed to stand to permit the floc to settle. Thereafter, the clarified water is withdrawn from the basin for filtration or further treatment as desired.

In a continuous operation to clarify turbid water, the coagulant and Cottrell flour are continuously blended with the turbulent influent and the resulting slurry thereafter mildly agitated while the floc forms. The water is then introduced into a quiescent zone wherein the floc settles out of the water, carrying therewith the turbid particles, and the clarified water continuously is drawn off and passed through filters to remove any floc that did not settle out. The amount of agitation and the period in which the water is retained in the flocculation zone are selected as necessary to assure the desired removal of the material causing turbidity.

The following examples will illustrate how the invention may be carried out but it is to be understood that the examples are illustrative and the invention is not to be limited thereto.

EXAMPLE I

In a continuous operation to clarify water from the Santiam River, Oregon, raw water having a pH of about 7.0 and a turbidity of 10 p.p.m. was introduced to a continuous type of treating unit and alum continuously blended to the influent at the rate of 1.02 grains per gallon. At the same time, Cottrell flour was blended into the influent at a rate of 0.152 grain per gallon. The pH of the slurry was about 6.3. The feed rate of the water was such that the average detention time in the unit was about two hours. The clarified water withdrawn from the quiescent zone of the unit had a turbidity of only 1 p.p.m. After filtering, the water was absolutely clear.

The water being treated in this example was "snow water," a term applied to water draining from the Cascade Mountains and having a milky appearance caused by extremely fine particles in the water. "Snow water" conditions are prevalent during the spring and early summer when the snow run-off occurs. With water treatment procedures conventionally used on "snow water" heretofore, some of the turbidity of the water carried through with the result the water discharged from the filtration plant had a slight haze. However, as indicated above, the water treated with Cottrell flour was completely clarified.

By contrast to the foregoing example, the same water requires about 1.9 grains per gallon of alum and about 0.50 grain per gallon of lime to obtain comparable clarification of the water in the treating unit and the lime treatment is not successful in removing all of the turbidity from "snow water."

EXAMPLE II

Water obtained from the Cowlitz River, Washington, was treated in a continuous type treatment unit. The influent water had a pH of 7.0 and a turbidity of 9 p.p.m. Alum was added to the turbid water at the rate of 1.0 grain per gallon and Cottrell flour was added at the rate of 0.6 grain per gallon. The effluent discharged from the unit had a pH of 6.6 and a turbidity of 4 p.p.m. that was completely removed upon subsequent filtering.

EXAMPLE II

Water obtained from the Cowlitz River, Washington, was treated in a continuous type treatment unit. The influent water had a pH of 7.0 and a turbidity of 9 p.p.m. Alum was added to the turbid water at the rate of 1.0 grain per gallon and Cottrell flour was added at the rate of 0.6 grain per gallon. The effluent discharged from the unit had a pH of 6.6 and a turbidity of 4 p.p.m. that was completely removed upon subsequent filtering.

The conventional treatment of this water comprised the use of lime as a coagulant aid. However, more effective results were obtained using Cottrell flour at a cost of about one third compared to the cost of lime treatment.

EXAMPLE III

In another instance, water from the water source for Lewiston Orchards, Idaho, having a pH of about 7.5 and a turbidity of about 10 p.p.m., was treated in a continuous type unit with 2.5 grains per gallon of alum and about 1.0 grain per gallon of Cottrell flour. The resulting slurry had a pH of about 6.3 and the effluent water, after filtering, was absolutely clear.

In this instance again, the previous conventional treatment had involved the use of lime as the coagulant aid. However, the Cottrell flour gave superior results in the clarification and, furthermore, the flocculation of the alum was so improved with the Cottrell flour that the filter run was extended considerably in length of time.

As compared with the use of lime and alum or alum alone, the use of Cottrell flour will substantially increase the capacity of a water plant because with Cottrell flour the floc forms faster, settles faster, and allows longer filter runs.

Tests indicate that the Cottrell flour is effective as a coagulant aid over a relatively wide slurry pH. Alum is, of course, an acidifying agent and when added to water to be treated reduces the pH of the water. The Cottrell flour, on the other hand, is alkaline in character and its addition to the water tends to raise the pH thereof. The preferred amount of Cottrell flour appears to be an amount sufficient to produce a slurry pH of about 6.3 or 6.4, although satisfactory results were obtained with slurries varying in pH from about 6.1 to 6.9. Peculiarly, even the addition of excessive amounts of Cottrell flour could not effect an increase in slurry pH over about 6.9 during actual plant tests, and when the amount of Cottrell flour added to the water exceeded the minimum amount necessary to raise the pH to 6.9, satisfactory clarification was not obtained. It appears, therefore, that the maximum permissible amount of Cottrell flour that may be added to water treated with alum is that amount necessary to raise the pH to 6.9, though as observed above a smaller amount, namely, that necessary to raise the pH to about 6.3 or 6.4, is preferred.

Moreover, the addition of excessive amounts of alum and Cottrell flour causes the formation of a brownish haze in the effluent. This, of course, will deter the water plant operator from increasing the dosage beyond the required amount, as operators frequently attempt to do, resulting in a saving in the amount of alum and Cottrell flour used. The amount of Cottrell flour which is necessary will vary depending on the water being treated, but I find that generally from 0.1 to 1.0 grain Cottrell flour per gallon of water give satisfactory results though under unusual conditions amounts varying from about 0.05 to 3.0 grains per gallon may be required.

Because of the cheapness of Cottrell flour, the small amounts necessary, and the increased rate at which the treatment plant can operate, the use of the water clarification process of the invention results in substantial savings as compared with other processes heretofore utilized.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. In a process of clarifying turbid water, the step which comprises adding to turbid water an acidifying coagulant in an amount sufficient to reduce the pH below 7.0 and a sufficient quantity of Cottrell flour to augment the action of said coagulant but less than the amount which would increase the pH to more than 6.9.

2. The process as claimed in claim 1 wherein said coagulant is an inorganic salt of aluminum.

3. A process as claimed in claim 1 wherein said coagulant is aluminum sulfate.

4. The process of clarifying turbid water which comprises adding to that water an acidifying coagulant in an amount sufficient to reduce the pH below 7.0 and a sufficient quantity of Cottrell flour to augment the action of said coagulant and produce a slurry having a pH of between about 6.0 and 6.9.

5. The process of claim 4 wherein from about 0.1 to about 1.0 grain per gallon of Cottrell flour are added.

6. The process of claim 4 wherein the resulting slurry has a pH of about 6.3.

7. The process of claim 4 wherein the acidifying coagulant is aluminum sulfate.

References Cited in the file of this patent

UNITED STATES PATENTS

| | | |
|---|---|---|
| 1,672,584 | Travers | June 5, 1928 |
| 2,021,672 | Spaulding | Nov. 19, 1935 |
| 2,286,420 | Jackson | June 16, 1942 |
| 2,301,429 | Magill | Nov. 10, 1942 |
| 2,420,340 | Ryznar | May 13, 1947 |